(12) United States Patent
Hamer et al.

(10) Patent No.: US 8,878,406 B2
(45) Date of Patent: Nov. 4, 2014

(54) STATOR INCLUDING CONDUCTORS PROVIDED WITH A COMPOSITE SLEEVE

(75) Inventors: Colin Hamer, Noblesville, IN (US);
John Matthew Sigler, Yorktown, IN (US); Max A. Butcher, Nashville, IN (US); Arlen Phillip Suter, Pendleton, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 516 days.

(21) Appl. No.: 13/312,325

(22) Filed: Dec. 6, 2011

(65) Prior Publication Data

US 2013/0140925 A1 Jun. 6, 2013

(51) Int. Cl.
*H02K 3/50* (2006.01)

(52) U.S. Cl.
USPC ............................................. 310/71; 310/45

(58) Field of Classification Search
USPC ....................................... 310/71, 45
IPC ..................................... H02K 3/50,5/225, 3/30
See application file for complete search history.

(56) References Cited

U.S. PATENT DOCUMENTS

| 4,319,074 | A | * | 3/1982 | Yaste et al. ..................... 174/116 |
| 5,723,933 | A | * | 3/1998 | Grundl et al. ................. 310/266 |
| 5,793,132 | A | * | 8/1998 | Hirose et al. .................... 310/71 |
| 5,914,546 | A | * | 6/1999 | Terakado et al. ............... 310/71 |
| 6,896,562 | B2 | * | 5/2005 | Takizawa et al. ............. 439/874 |
| 6,936,128 | B2 | * | 8/2005 | Oesterheld et al. ...... 156/244.11 |
| 8,749,107 | B2 | * | 6/2014 | Trammell et al. ............. 310/215 |

\* cited by examiner

*Primary Examiner* — Dang Le
(74) *Attorney, Agent, or Firm* — Cantor Colburn LLP

(57) ABSTRACT

A stator includes a stator core having a plurality of slot segments, a plurality of stator winding conductors arranged in select ones of the plurality of slot segments, a jumper conductor interconnecting select ones of the plurality of stator winding conductors to form one or more stator windings, a common conductor connected to at least one of the stator winding conductors, a phase conductor connected to corresponding ones of the one or more stator windings, and a composite sleeve provided on at least one of the jumper conductor, the common conductor, and the phase conductor. The composite sleeve includes a first sleeve, and a second sleeve positioned about the first sleeve. One of the first and second sleeves is formed from a compressed amide synthetic fiber. The first and second sleeves cooperate to provide protection for the conductor from external elements.

20 Claims, 7 Drawing Sheets

STATOR INCLUDING CONDUCTORS PROVIDED WITH A COMPOSITE SLEEVE

BACKGROUND OF THE INVENTION

Exemplary embodiments pertain to the art of electric machines and, more particularly, to a stator including conductors provided with a composite sleeve.

Electric machines include stators that are wound with one or more conductors. The one or more conductors form a stator winding that is designed to impart or receive an electromotive force from rotor windings to either power the electric machine in the case of an electric motor, or pass an electrical current to an external load in the case of a generator. Stators often include multiple stator windings that are joined to establish a desired connection such as a delta connection or a wye connection.

In such cases, windings are joined by jumpers and/or crossovers that provide desired electrical interconnections. The number of jumpers can vary greatly and often times are required to include multiple bends in order to establish the desired interconnections and to nest with other jumpers without appreciably adding to an overall size of the stator. In addition to the jumpers, stators include phase leads that electrically connect each stator winding to an appropriate electrical phase on an external device, and a neutral bar that provides a neutral connection to the stator. The jumpers, phase leads, and neutral bar are generally provided with an electrical insulation for protection. Overtime, the electrical insulation may break down as a result of chafing caused by vibrations, compactions during manufacture, exposure to external elements, or the like.

BRIEF DESCRIPTION OF THE INVENTION

Disclosed is a stator including a stator core having a plurality of slot segments, a plurality of stator winding conductors arranged in select ones of the plurality of slot segments, one or more jumper conductors interconnecting select ones of the plurality of stator winding conductors to form one or more stator windings, one or more common conductors connected to at least one of the stator winding conductors, one or more phase conductors connected to corresponding ones of the one or more stator windings. A composite sleeve is provided on at least one of the one or more jumper conductors, one or more common conductors, and the one or more phase conductors. The composite sleeve includes a first sleeve, and a second sleeve positioned about the first sleeve. One of the first and second sleeves is formed from a compressed amide synthetic fiber. The first and second sleeves cooperate to provide protection for the conductor from external elements.

Also disclosed is an electric machine including a housing, a rotor rotationally positioned within the housing, and a stator fixedly mounted relative to the housing and the rotor. The stator includes a plurality of slot segments, a plurality of stator winding conductors arranged in select ones of the plurality of slot segments, one or more jumper conductors interconnecting select ones of the plurality of stator winding conductors to form one or more stator windings, one or more common conductors connected to at least one of the stator winding conductors, and one or more phase conductors connected to corresponding ones of the one or more stator windings. A composite sleeve is provided on at least one of the one or more jumper conductors, one or more common conductors, and the one or more phase conductors. The composite sleeve includes a first sleeve, and a second sleeve positioned about the first sleeve. One of the first and second sleeves is formed from a compressed amide synthetic fiber. The first and second sleeves cooperate to provide protection for the conductor from external elements.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
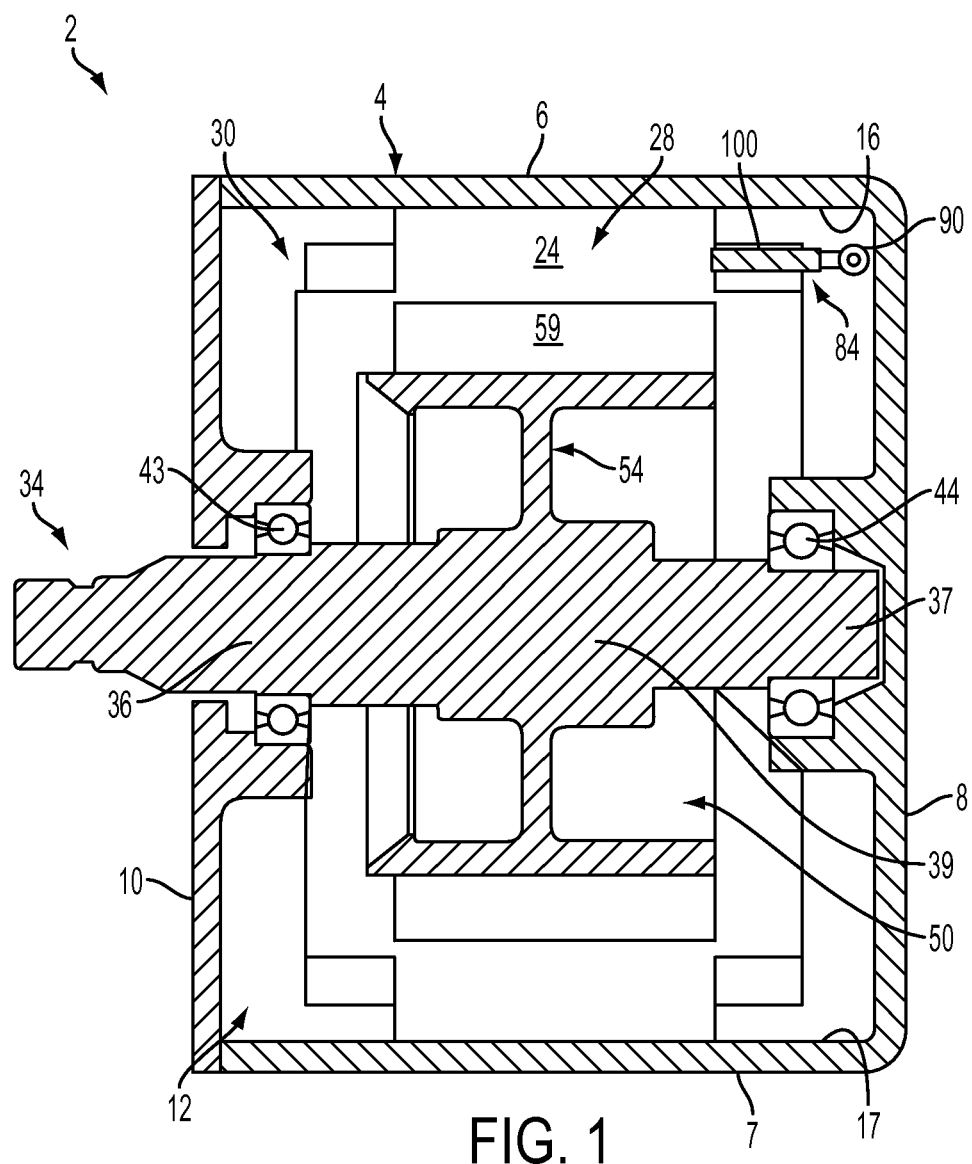
FIG. 1 depicts a cross-sectional view of an electric machine including a stator having conductors provided with a composite sleeve in accordance with an exemplary embodiment.

An electric machine in accordance with an exemplary embodiment is indicated generally at 2 in FIG. 1. Electric machine 2 includes a housing 4 having first and second side walls 6 and 7 that are joined by a first end wall 8 and a second end wall or cover 10 to collectively define an interior portion 12. First side wall 6 includes an inner surface 16 and second side wall 7 includes an inner surface 17. At this point it should be understood that housing 4 could also be constructed to include a single side wall having a continuous inner surface. Electric machine 2 is further shown to include a stator 24 arranged at inner surfaces 16 and 17 of first and second side walls 6 and 7. Stator 24 includes a stator core 28 having a plurality of slot segments 29 (FIG. 2) which, as will be discussed more fully below, are provided with a plurality of stator windings 30.

Electric machine 2 is also shown to include a shaft 34 rotatably supported within housing 4. Shaft 34 includes a first end 36 that extends to a second end 37 through an intermediate portion 39. First end 36 is rotatably supported relative to second end wall 10 through a first bearing 43 and second end 37 is rotatably supported relative to first end wall 8 through a second bearing 44. Shaft 34 supports a rotor assembly 50 that is rotatably mounted within housing 4. Rotor assembly 50 includes a rotor hub 54 that is fixed relative to intermediate portion 39 of shaft 34, and a rotor lamination 59 that is configured to rotate relative to stator 24.

Figure 2:
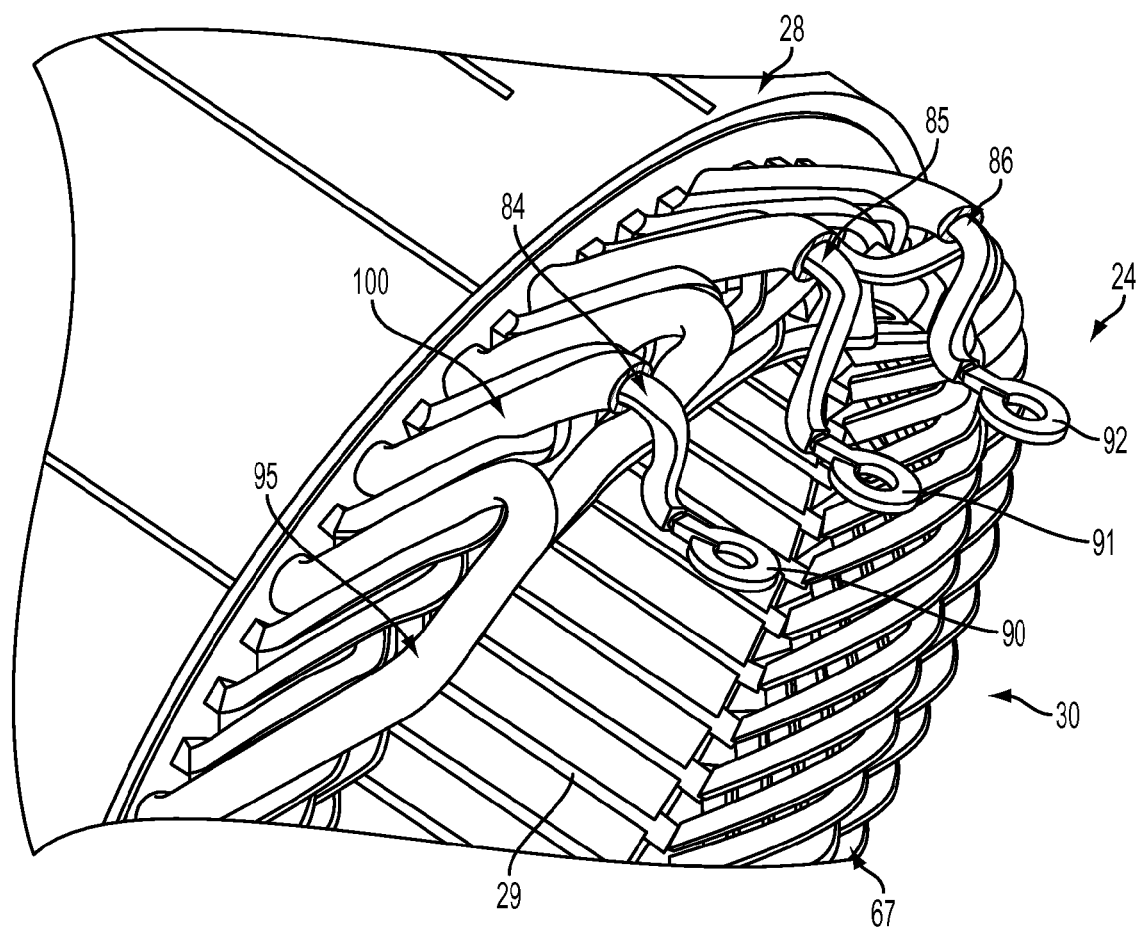
FIG. 2 depicts a partial perspective view of the stator of FIG. 1.
Figure 3:
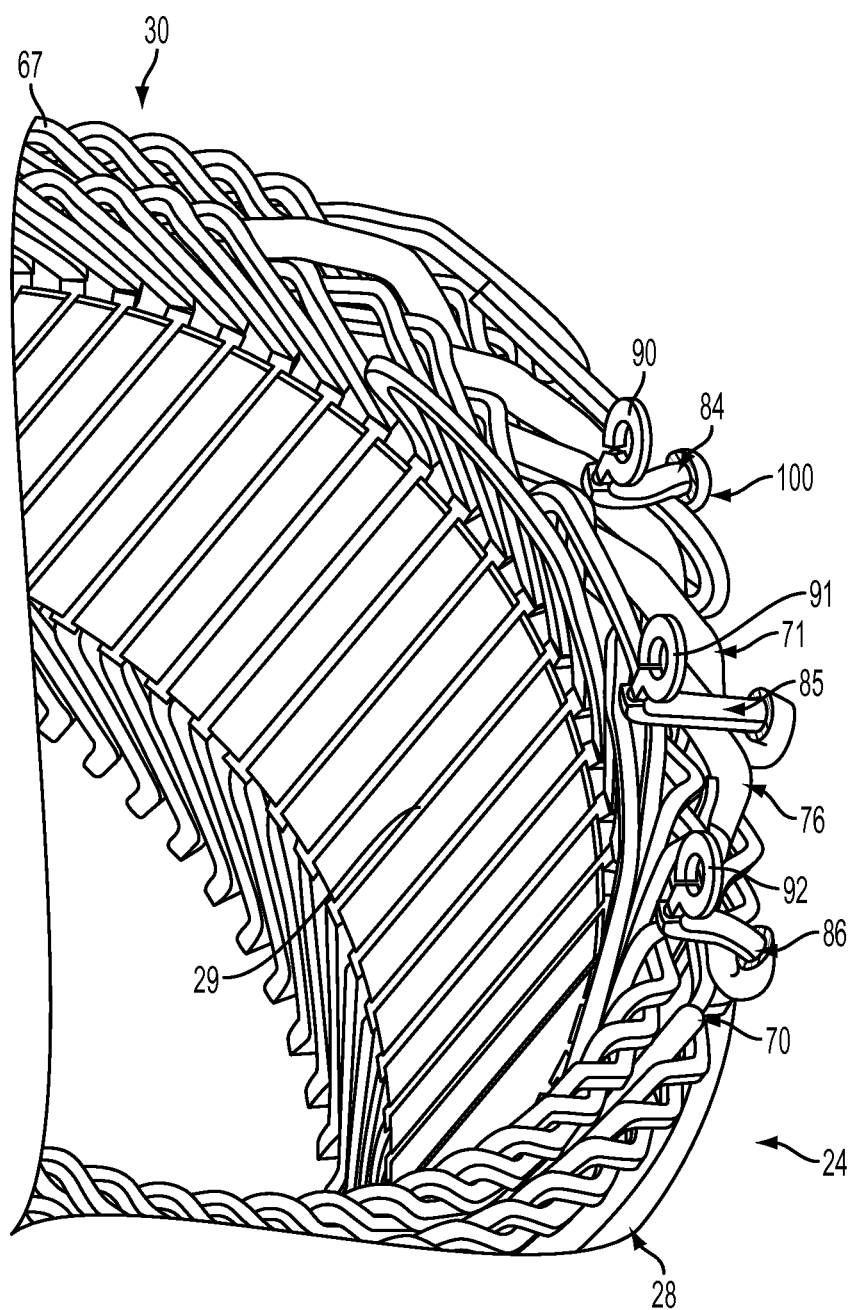
FIG. 3 depicts another partial perspective view of the stator of FIG. 1.
Figure 4:
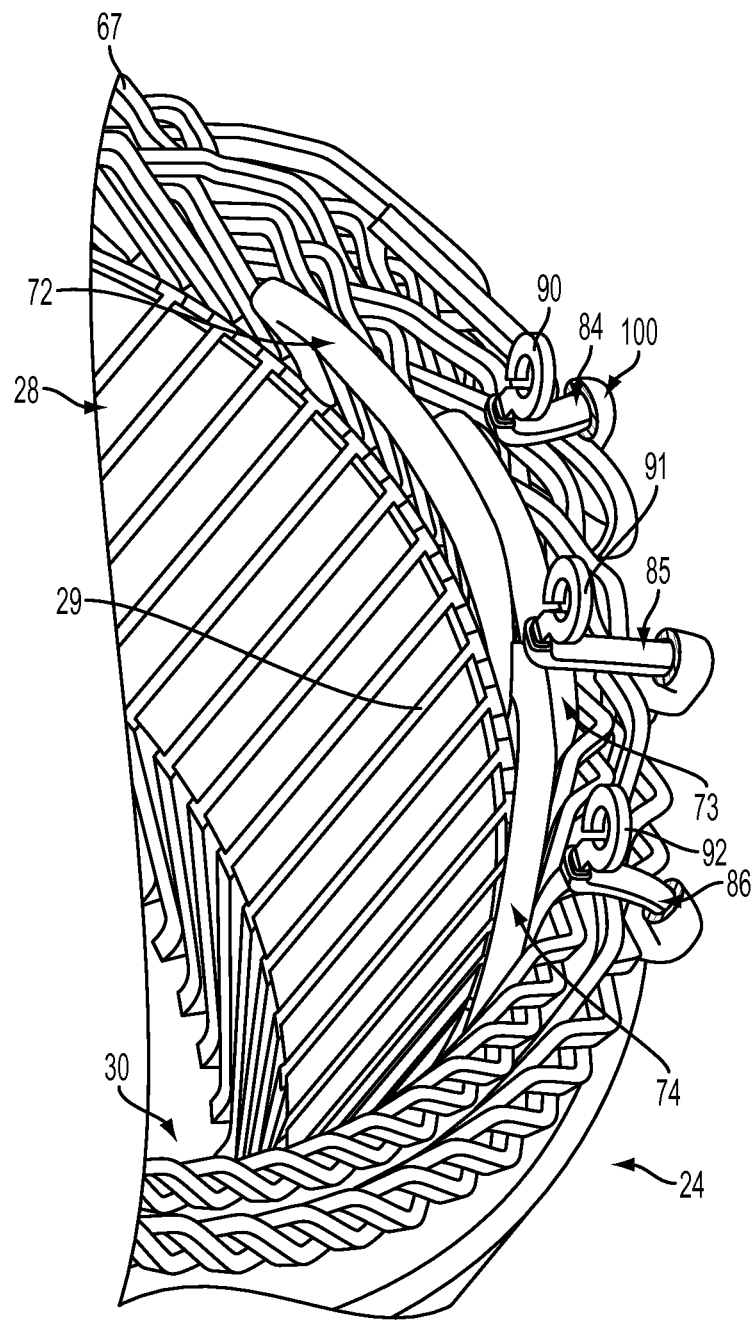
FIG. 4 depicts still another partial perspective view of the stator of FIG. 1

As shown in FIGS. 2-4, stator windings 30 are formed from a plurality of stator winding conductors, one of which is indicated at 67. Stator winding conductors 67 are selectively connected by a plurality of cross-over conductors two of which are shown at 70 and 71 in FIG. 3, jumper conductors two of which are shown at 72-74 in FIG. 4 and at least one common conductor 76. Cross-over conductors 70, 71 and jumper conductors 72-74 establish a desired electrical connection, e.g., a wye connection or a delta connection, for stator 24. Stator 24 is also shown to include a plurality of phase conductors 84-86 each having a corresponding connector member 90-92. Phase conductors 84-86 carry electrical current to or from stator windings 30. The number of cross-over conductors, jumper conductors, and phase conductors can vary. Stator 24 is further shown to include a neutral bar 95 that is configured to connect stator windings 30 to a neutral conductor (not shown). In the exemplary embodiment shown, cross-over conductors 70, 71, jumper conductors 72-74, phase conductors 84-86, and neutral bar 95 are provided with a composite sleeve such as shown at 100 in connection with phase conductor 84.

Figure 5:
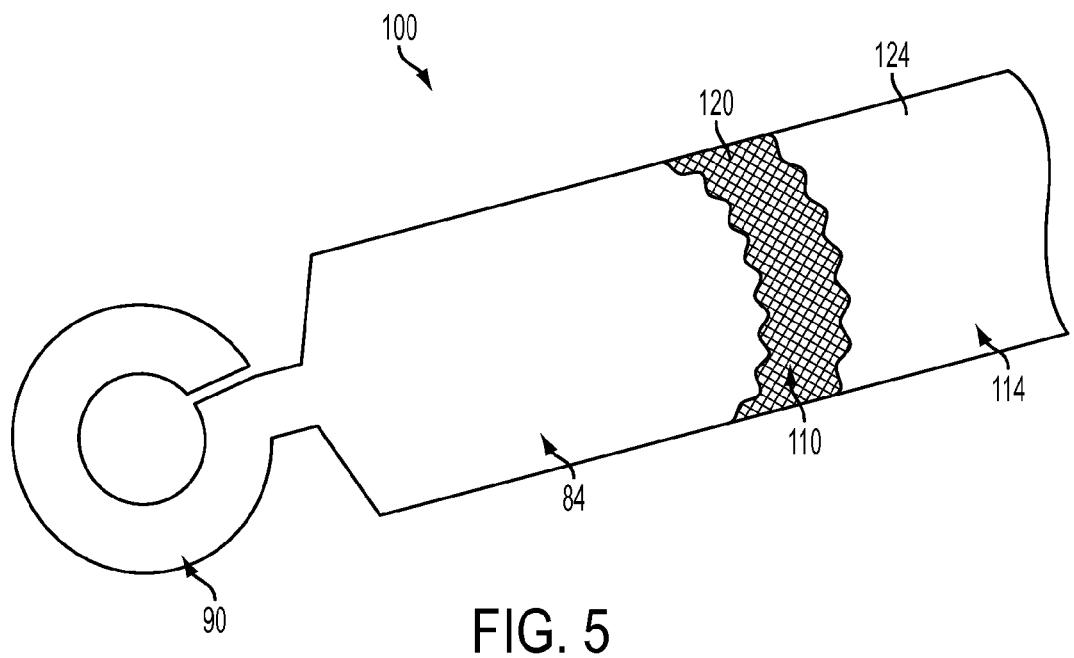
FIG. 5 depicts a perspective view of a phase conductor or the stator of FIG. 1 having a composite sleeve in accordance with an aspect of the exemplary embodiment.

In accordance with one aspect of the exemplary embodiment illustrated in FIGS. 4 and 5, composite sleeve 100 includes a first sleeve 110 and a second sleeve 114. First sleeve 110 is formed from a amide synthetic fiber 120 having a —C(=O)N— chain. Examples of amides having a —C(=O)N— chain include polyimides such as Kapton®, and aramids including para-aramids such as poly-paraphenylene terephthalamide or Kevlar®, and meta-aramids such as Nomex®. More specifically, first sleeve 110 is formed from a high strength/high temperature material that is stronger than steel on an equal weight basis. Of course, it should be understood that other amide synthetic fibers having substantially similar general qualities could also be employed as discussed above. In accordance with one aspect of the exemplary embodiment, amide synthetic fiber 120 is loosely woven or braided to aid in compression and bending. That is, first sleeve 110 follows a contour of phase conductor 84 and thus is required to include multiple bends. Second sleeve 114 is formed from an externally activated shrinkable material 124. In accordance with one example, the externally activated shrinkable material 124 could take the form of heat shrinkable tubing. However, other externally activated shrinkable materials could also be employed. The term externally activated should be construed to include temperature and/or light activated materials, as well as materials activated by exposure to gases or other substances.

First sleeve 110 is applied about an outer surface (not separately labeled) of phase conductor 84, and second sleeve 114 is applied over first sleeve 110. Eternally activated shrinkable material 124 is activated causing second sleeve 114 to contract about first sleeve 110 compressing the amide synthetic fiber 120. Once the amide synthetic fiber 120 is compressed, first and second sleeves 110 and 114 cooperate synergistically to provide mechanical strength, abrasion resistance, and insulation to phase conductor 84. That is, second sleeve 114 in addition to being formed from an externally activated shrinkable material may also be formed from a material that provides electrical and/or temperature insulation qualities. Second sleeve 114 may also be formed from a material resistant to a wide variety of chemicals that could degrade phase conductor 84. Composite sleeve 100 thus provides multiple layers of protection that protect phase conductor 84 from exposure to high temperature, exposure to vibration and chaffing, and exposure to coolant.

Figure 6:
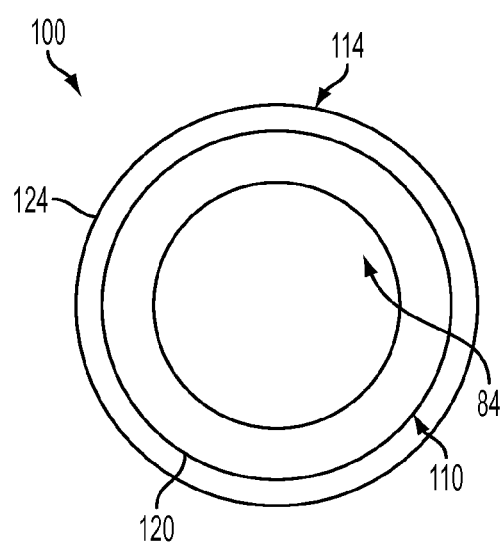
FIG. 6 depicts a cross-sectional view of the phase conductor and composite sleeve of FIG. 5.
Figure 7:
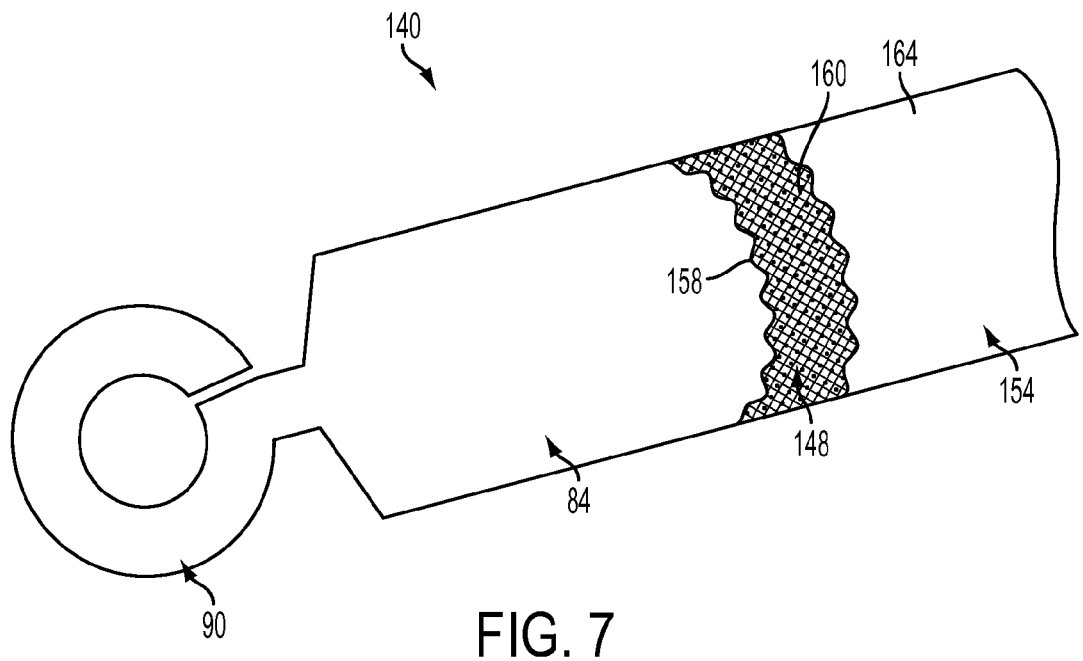
FIG. 7 depicts a perspective view of the phase conductor having a composite sleeve in accordance with another aspect of the exemplary embodiment.

Reference will now be made to FIGS. 6 and 7 in describing a composite sleeve 140 in accordance with another aspect of the exemplary embodiment. Composite sleeve 140 is positioned about phase conductor 84 and includes a first sleeve 148 and a second sleeve 154. First sleeve 148 is formed from an amide synthetic fiber 158 impregnated with an externally activated shrinkable material 160. In a manner similar to that discussed above, externally activated shrinkable material 160 takes the form of a heat shrinkable material. However, other activation means can also be employed. In the exemplary embodiment shown, second sleeve 154 is also formed from an externally activated shrinkable material 164.

In accordance with the above arrangement, first sleeve 148 is positioned about an outer surface (not separately labeled) of phase conductor 84. Once in position, externally activated shrinkable material 160 is activated causing first sleeve 148 to contract about phase conductor 84. At this point, second sleeve 154 is positioned about first sleeve 148 and activated. Second sleeve 154 contracts about and further compresses first sleeve 148. In this manner, first sleeve 148 provides abrasion resistance and mechanical strength, while second sleeve 154 provides insulation and protection from external influences.

Figure 8:
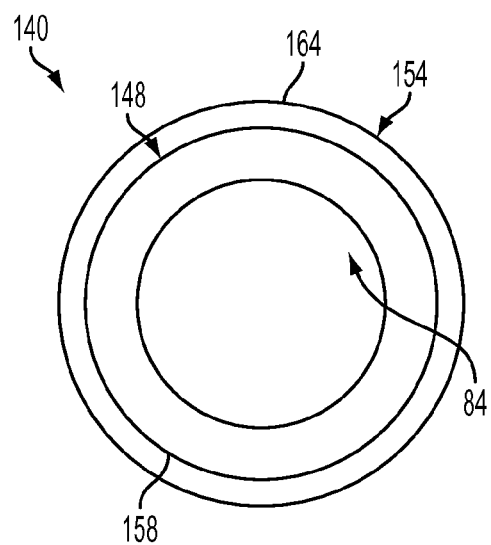
FIG. 8 depicts a cross-sectional view of the phase conductor and composite sleeve of FIG. 7.
Figure 9:
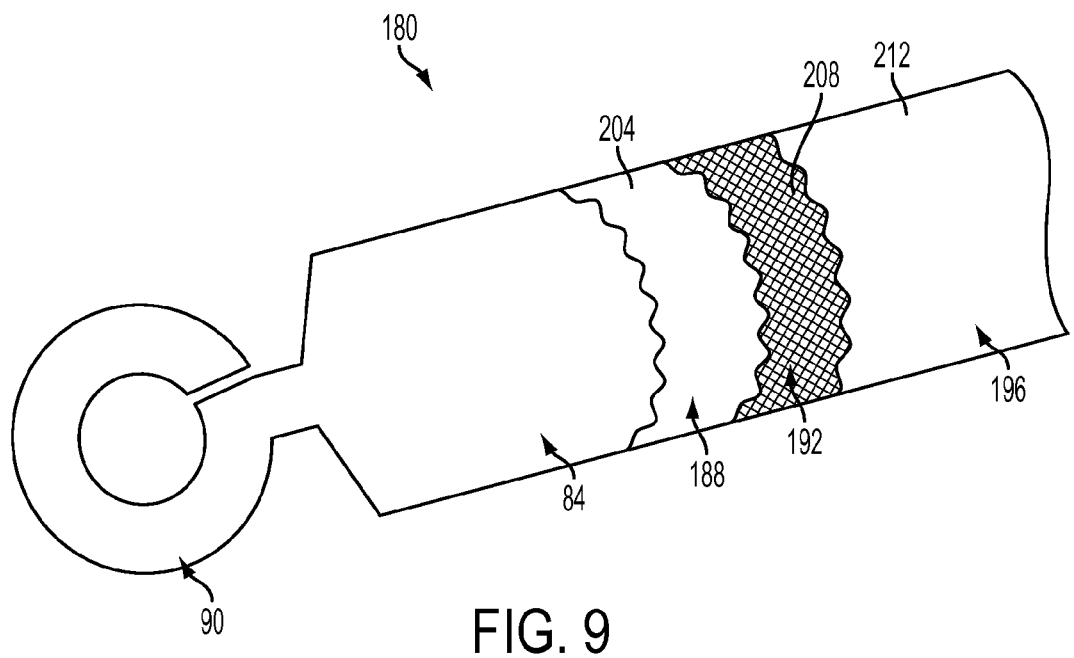
FIG. 9 depicts a perspective view of the phase conductor having a composite sleeve in accordance with yet another aspect of the exemplary embodiment.
Figure 10:
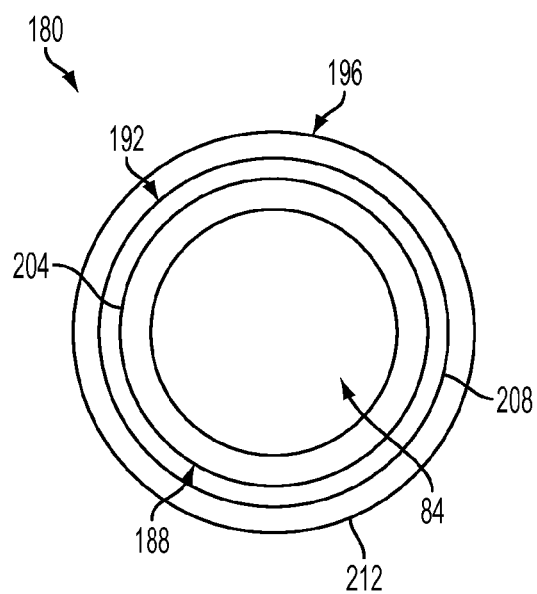
FIG. 10 depicts a cross-sectional view of the phase conductor and composite sleeve of FIG. 9.

Reference will now follow to FIGS. 8 and 9 in describing a composite sleeve 180 formed in accordance with another aspect of the exemplary embodiment. Composite sleeve 180 is provided about a phase conductor 84 and includes a first sleeve 188, a second sleeve 192, and a third sleeve 196. First sleeve 188 is formed from an externally activated shrinkable material 204. In a manner similar to that discussed above, externally activated shrinkable material 204 takes the form of a heat shrinkable material. However, other activation means can also be employed. Second sleeve 192 is formed from an amide synthetic fiber 208, and third sleeve 196 is formed from an externally activated shrinkable material 212 that may or may not be similar to first sleeve 188. With this arrangement, first sleeve 188 is positioned about an outer surface (not separately labeled) of phase conductor 84 and externally activated shrinkable material 204 is activated. First sleeve 188 contracts about phase conductor 84 providing a first protective layer. Second sleeve 192 is positioned about first sleeve 188 and third sleeve 196 is positioned about second sleeve 192. Third sleeve 196 is exposed to an activation input and compressed about second sleeve 192 and first sleeve 188 to form composite sleeve 180.

At this point it should be understood that the exemplary embodiments describe a stator including various conductors provided with a composite sleeve that includes a layer of compressed loosely woven amide synthetic fibers. The amide fibers may be self compressed, that is compressed by an externally activated material impregnated into the amide fibers, or by an additional outer layer. Regardless, the amide layer and additional layers provide mechanical strength, abrasion resistance, and/or electrical insulation, and resistance to a wide variety of external environmental conditions such as temperature, chemicals, liquids and the like.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A stator comprising:
a stator core including a plurality of slot segments;
a plurality of stator winding conductors arranged in select ones of the plurality of slot segments;
one or more jumper conductors interconnecting select ones of the plurality of stator winding conductors to form one or more stator windings;
one or more common conductors connected to at least one of the stator winding conductors;
one or more phase conductors connected to corresponding ones of the one or more stator windings; and
a composite sleeve provided on at least one of the one or more jumper conductors, one or more common conductors, and the one or more phase conductors, the composite sleeve including a first sleeve, and a second sleeve positioned about the first sleeve, one of the first and second sleeves being formed from a compressed amide synthetic fiber, the first and second sleeves cooperating to provide protection for the conductor from external elements.

2. The stator according to claim 1, wherein the other of the first and second sleeves is formed from an externally activated shrinkable material.

3. The stator according to claim 2, wherein amide synthetic fiber forming the first sleeve is impregnated with an externally activated shrinkable material.

4. The stator according to claim 2, wherein the externally activated shrinkable material is heat activated.

5. The stator according to claim 1, wherein the first sleeve is formed from the amide synthetic fiber and the second sleeve is formed from an externally activated shrinkable material.

6. The stator according to claim 1, wherein the first sleeve is formed from a heat shrinkable material and the second sleeve is formed the amide synthetic fiber.

7. The stator according to claim 6, further comprising: a third sleeve extending about the second sleeve, the third sleeve being formed from an externally activated shrinkable material.

8. The stator according to claim 1, further comprising: a neutral bar electrically connecting each of the one or more stator windings, the composite sleeve being provided on the neutral conductor.

9. The stator according to claim 1, wherein the composite sleeve is provided on at least one of the one or more jumper conductors, one or more common conductors, and the one or more phase conductors.

10. The stator according to claim 1, further comprising: one or more cross-over conductors, the composite sleeve being provided on the one or more crossover conductors.

11. An electric machine comprising:
a housing;
a rotor rotationally positioned within the housing;
a stator fixedly mounted relative to the housing and the rotor, the stator including a plurality of slot segments, a plurality of stator winding conductors arranged in select ones of the plurality of slot segments, one or more jumper conductors interconnecting select ones of the plurality of stator winding conductors to form one or more stator windings, one or more common conductors connected to at least one of the stator winding conductors, and one or more phase conductors connected to corresponding ones of the one or more stator windings; and
a composite sleeve provided on at least one of the one or more jumper conductors, one or more common conductors, and the one or more phase conductors, the composite sleeve including a first sleeve, and a second sleeve positioned about the first sleeve, one of the first and second sleeves being formed from a compressed amide synthetic fiber, the first and second sleeves cooperating to provide protection for the conductor from external elements.

12. The stator according to claim 11, wherein the other of the first and second sleeves is formed from an externally activated shrinkable material.

13. The stator according to claim 12, wherein amide synthetic fiber forming the first sleeve is impregnated with an externally activated shrinkable material.

14. The stator according to claim 12, wherein the externally activated shrinkable material is heat activated.

15. The stator according to claim 11, wherein the first sleeve is formed from the amide synthetic fiber and the second sleeve is formed from an externally activated shrinkable material.

16. The stator according to claim 11, wherein the first sleeve is formed from a heat shrinkable material and the second sleeve is formed the amide synthetic fiber.

17. The stator according to claim 16, further comprising: a third sleeve extending about the second sleeve, the third sleeve being formed from a externally activated shrinkable material.

18. The stator according to claim 11, further comprising: a neutral conductor electrically connecting each of the one or more stator windings, the composite sleeve being provided on the neutral conductor.

19. The stator according to claim 11, wherein the composite sleeve is provided on at least one of the one or more jumper conductors, the one or more common conductors, and the one or more phase conductors.

20. The stator according to claim 11, further comprising: one or more crossover conductors, the composite sleeve being provided on the one or more crossover conductors.

* * * * *